United States Patent
Shi

(10) Patent No.: US 9,810,883 B2
(45) Date of Patent: Nov. 7, 2017

(54) PHOTOGRAPHIC OPTICAL SYSTEM

(71) Applicant: Rongbao Shi, Shenzhen (CN)

(72) Inventor: Rongbao Shi, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/353,901

(22) Filed: Nov. 17, 2016

(65) Prior Publication Data

US 2017/0184819 A1     Jun. 29, 2017

(30) Foreign Application Priority Data

Dec. 24, 2015    (CN) .......................... 2015-1-0981379
Jul. 22, 2016    (JP) ................................ 2016-143870

(51) Int. Cl.
    *G02B 3/02*          (2006.01)
    *G02B 13/00*        (2006.01)
    *G02B 9/64*          (2006.01)
    *G02B 27/00*        (2006.01)

(52) U.S. Cl.
    CPC ........... *G02B 13/0045* (2013.01); *G02B 9/64* (2013.01); *G02B 27/0025* (2013.01)

(58) Field of Classification Search
    CPC ... G02B 13/0045; G02B 9/64; G02B 27/0025
    USPC .......................................................... 359/708
    See application file for complete search history.

(56) References Cited

U.S. PATENT DOCUMENTS

| | | | | |
|---|---|---|---|---|
| 5,528,429 A | * | 6/1996 | Hagimori | G02B 15/163 |
| | | | | 359/689 |
| 6,181,484 B1 | * | 1/2001 | Sato | G02B 15/161 |
| | | | | 359/692 |
| 2016/0170180 A1 | * | 6/2016 | Son | G02B 13/0045 |
| | | | | 359/708 |

* cited by examiner

*Primary Examiner* — James Greece
(74) *Attorney, Agent, or Firm* — Na Xu; IPro, PLLC

(57) ABSTRACT

The present invention discloses a photographic optical system which includes a first lens (focal length f1), a second lens (focal length f2), a third lens (focal length f3), a fourth lens (focal length f4), a fifth lens (focal length f5), a sixth lens (focal length f6) and a seventh lens (focal length f7). The photographic optical system disclosed in the present invention by optimizing rationally face shape, distributing focal power, selecting optical material, is designed as a big relative aperture photographic optical system, and can provide the imaging performance in low illumination environment.

10 Claims, 4 Drawing Sheets

PHOTOGRAPHIC OPTICAL SYSTEM

FIELD OF THE INVENTION

The present invention discloses a photographic optical system, specifically, a photography optical system of portable electronic devices.

DESCRIPTION OF RELATED ART

In recent years, with the vigorous development of mini photographic lens, the demand of mini picturing module is rising. The general camera sensor is either photosensitive coupling component or complementary metal oxide conductive component. With the progress of semiconductor manufacturing technology, the sensor pixel size is smaller. Combined with current development trend of electronic product of better function, light, thin, short and small, as a result, the mini camera with good imaging quality becomes the mainstream of current market.

In the camera sensor lens, the resolution of image gradually increases, pixel size decreases, the lens shall have high resolution and excellent optical performance, for example, wide angle of lens, imaging in high dynamic range, reducing tolerance sensitivity of the lens, etc. The existing camera lens composed of seven pieces of lens, restricted by the structure, is unable to correct further senior aberration, for example spherical aberration, so that the imaging performance is limited.

Therefore, it is necessary to provide a kind of new technology solution to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
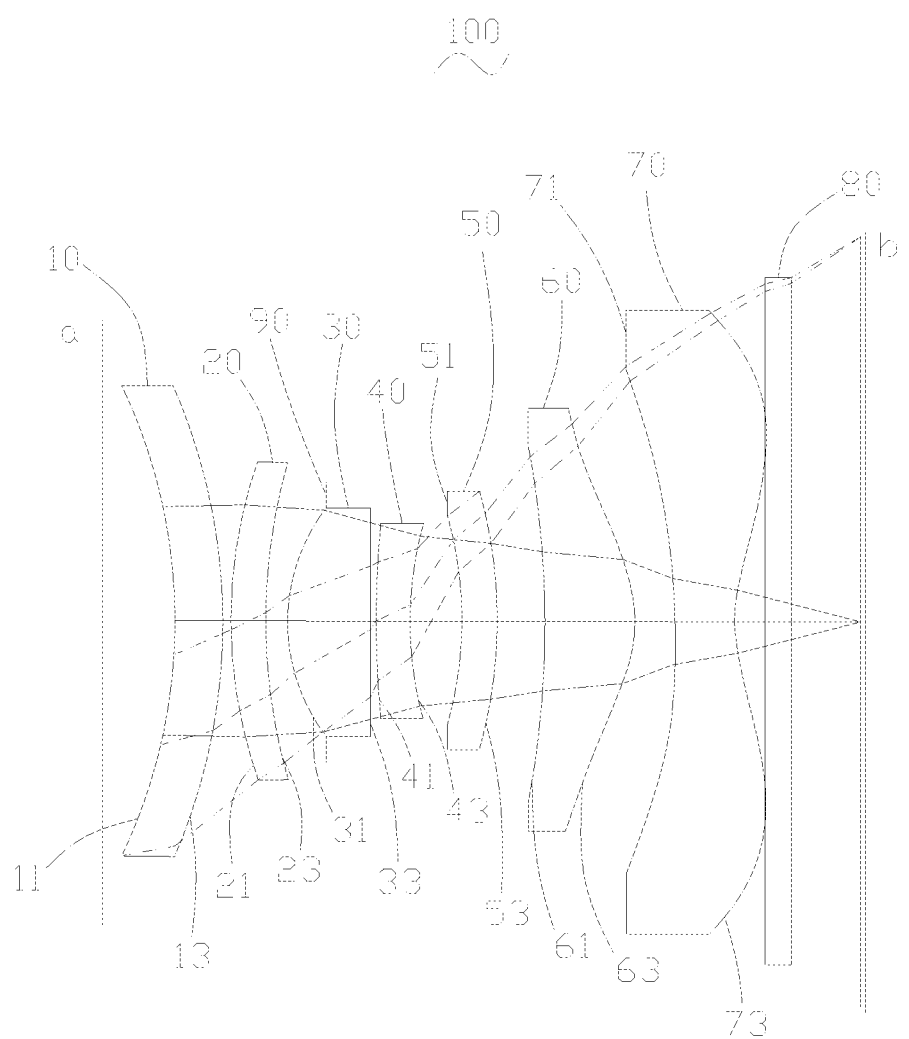
FIG. 1 is an exemplary structural diagram of a photographic optical system of the present disclosure.

FIG. 1 is an exemplary structural diagram of a photographic optical system of the present disclosure. The photographic optical system 1 comprises seven pieces of lens installed coaxially and lined up from an object side a to an image side b in turn as follows: a first lens 10, a second lens 20, a third lens 30, a fourth lens 40, a fifth lens 50, a sixth lens 60 and a seventh lens 70. In this embodiment, 7 lenses above are plastic lenses.

The first lens 10 is a positive lens and has positive refractive power. An object side surface 11 is concave and is made of plastic material. An object side surface 11 or/and the image side surface 13 of the first lens 10 is spherical or aspherical. In other embodiments, the first lens can also be a negative lens and can have negative refractive power.

An object side surface 21 of the second lens 20 is convex and an image side surface 23 is concave and is made of plastic material. Each of the object side surface 21 and the image side surface 23 of the second lens 20 has respectively one inflection point.

An object side 31 of the third lens 30 is convex and an image side surface 33 is concave, and is made of plastic material. The object side surface 31 and the image side surface 33 of the third lens 30 are aspherical. The image side surface 43 of the third lens 30 has one point of inflection and one stagnation point.

The object side surface 41 of the fourth lens 40 is convex and the image side surface 43 of the fourth lens 40 is concave. The fourth lens is made of plastic material. The object side surface 41 and the image side surface 43 of the fourth lens 40 are aspherical. The object side surface 41 of the fourth lens 40 has one point of inflection.

An object side surface 51 of the fifth lens 50 is concave and an image side surface 53 is convex, is made of plastic material. The object side surface 51 and the image side surface 53 of the fifth lens 50 are aspherical. The image side surface 53 of the fifth lens 50 has one point of inflection.

An object side surface 61 of the sixth lens 60 is concave and an image side surface 63 is convex. The sixth lens 60 is made of plastic material. The object side surface 61 and the image side surface 63 of the sixth lens 60 are aspherical. The image side surface 63 of the sixth lens 60 has two points of inflection.

The seventh lens 70 is a negative lens. The object side surface 71 of the seventh lens 70 is concave and the image side surface 73 is transferred from concave to convex from optical axis to circumference. The seventh lens 70 is made of plastic. The object side surface 71 and the image side surface 73 of the seventh lens 70 are aspherical. The object side surface 71 of the seventh lens 70 has one point of inflection. The image side surface 73 of the seventh lens 70 has at least one point of inflection and one stagnation point. In this embodiment, the image side surface 73 of the seventh lens 70 has one point of inflection and one stagnation point. In other embodiments, other number of inflection point and the stationary point can be set up according to the need.

In which, the object side surface is convex, which means the object side surface toward the object surface a is at convex shape. The object side surface is concave, which means that the object side surface toward the object surface a is at concave shape. The image side surface is convex, which means that the image side surface toward the image surface b is at convex shape. The image side surface is concave, which means that the image side surface toward the image surface b is at concave shape.

The combination refractive power of the first lens 10 and the second lens 20 is approximate zero refractive power, can correct rationally the spherical aberration, not introduce chromatic aberration and field curvature. The first lens 10 and the second lens 20 meet following condition:

$$F12>50 \text{ mm or } f12<-50 \text{ mm, wherein,}$$

f12 is the combination focal length of the first lens 10 and the second lens 20.

The fourth lens 40 and the fifth lens 50 are made of optical material with high refractive index and low abbe number, can reduce effectively chromatic aberration of the system. The seventh lens 70 is a negative refractive power lens, can reduce effectively the field curvature of the system. By optimizing rationally the surface shape of the seven lens, distributing refractive power, selecting optical material, the photographic optical system 1 has good imaging performance under low illumination.

The photographic optical system 100 also includes a glass plate 80 and a stop 90. The glass plate 80 is located at the side of the image surface b of the seventh lens. The glass plate 180 can be a filter to filter light. Its type can be selected according to actual requirement. The stop 90 is located at the object side surface 31 of the third lens 30, and can control the amount of light and the depth of field.

In the photographic optical system 100 disclosed in the present invention, in order to realize the design requirement of miniaturization, high sensitivity, high optical performance and wide view angle of the photographic optical system 100, the first lens 10, the second lens 20, the third lens 30, the fourth lens 40, the fifth lens 50, the sixth lens 60 and the seventh lens 70 of the photographic optical system 1 shall meet following conditions:

1. Focal Length:

Under the overall structure of the photographic optical system 100, focal lengths of the first lens 10, the second lens 20, the third lens 30, the fourth lens 40, the fifth lens 50, the sixth lens 60 and the seventh lens 70 of the photographic optical system 100 shall meet the following conditions:

$30 \text{ mm} < f1 < 150 \text{ mm};$ $100 \text{ mm} < f2 < 500 \text{ mm};$ $2 \text{ mm} < f3 < 5 \text{ mm};$ $-10 \text{ mm} < f4 < -2 \text{ mm};$ $-30 \text{ mm} < f5 < -10 \text{ mm};$ $1 \text{ mm} < f6 < 5 \text{ mm};$ $-5 \text{ mm} < f7 < -1.5 \text{ mm};$ $10 < f1/f < 40;$ $20 < f2/f < 80;$ $0.5 < f3/f < 1.5;$ $-2.5 < f4/f < -0.5;$ $-10 < f5/f < -2$ $0.2 < f6/f < 1.2;$ $-1.5 < f7/f < -0.4;$ where,
f1: The focal length of the first lens.
f2: The focal length of the second lens.
f3: The focal length of the third lens.
f4: The focal length of the fourth lens.
f5: The focal length of the fifth lens.
f6: The focal length of the sixth lens.
f7: The focal length of the seven lens.
f: The focal length of whole photography optical system.

2. Refractive Power

Under the overall structure of the photographic optical system 1, the refractive power of the first lens 10, the second lens 20, the third lens 30, the fourth lens 40, the fifth lens 50, the sixth lens 60 and the seventh lens 70 of the photographic optical system 1 shall meet the conditions:

$1.50 < n1 < 1.55, 1.50 < n2 < 1.55, 1.50 < n3 < 1.55,$ $1.60 < n4 < 1.70, 1.60 < n5 < 1.70, 1.50 < n6 < 1.55,$ $1.50 < n7 < 1.55;$ where,
n1: The refractive power of the first lens.
n2: The refractive power of the second lens.
n3: The refractive power of the third lens.
n4: The refractive power of the fourth lens.
n5: The refractive power of the fifth lens.
n6: The refractive power of the sixth lens.
n7: The refractive power of the seven lens.

3. Abbe Number

Under the overall structure of the photographic optical system 1, Abbe number of the first lens 10, the second lens 20, the third lens 30, the fourth lens 40, the fifth lens 50, the sixth lens 60 and the seventh lens 70 of the photographic optical system 1 shall meet the conditions:

$40 < v1 < 60, 40 < v2 < 60, 40 < v3 < 60, 15 < v4 < 30,$ $15 < v5 < 30, 40 < v6 < 60, 40 < v7 < 60;$ where
v1: Abbe number of the first lens.
v2: Abbe number of the second lens.
v3: Abbe number of the third lens.
v4: Abbe number of the fourth lens.
v5: Abbe number of the fifth lens.
v6: Abbe number of the sixth lens.
v7: Abbe number of the seven lens.

If the focal length, the refractive power and Abbe number of the first lens 10, the second lens 20, the third lens 30, the fourth lens 40, the fifth lens 50, the sixth lens 60 and the seventh lens 70 does not meet the conditions above, the chromatic aberration and telecenric characteristics of the photographic optical system 1 may be degraded, and the sensitivity of the photographic optical system 1 will be increased, it is difficult to realize the miniaturization and wide view angle of the photographic optical system 1, and is not conducive to reduce cost of the photographic optical system 1.

In this embodiment, the focal length the refractive power and Abbe number of the first lens 10, the second lens 20, the third lens 30, the fourth lens 40, the fifth lens 50, the sixth lens 60, the seventh lens 70 and glass pate 180 of the photographic optical system 1 are respectively shown in following table:

TABLE 1

| Type | Focal length (mm) | Refractive power | Abbe number |
| --- | --- | --- | --- |
| Photographic optical system | 3.5 | — | — |
| The first lens | 106.12 | 1.544 | 56.1 |
| The second lens | 237.59 | 1.544 | 56.1 |
| The third lens | 2.71 | 1.544 | 56.1 |
| The fourth lens | −5.29 | 1.651 | 21.5 |
| The fifth lens | −24.27 | 1.651 | 21.5 |
| The sixth lens | 2.25 | 1.544 | 56.1 |

TABLE 1-continued

| Type | Focal length (mm) | Refractive power | Abbe number |
|---|---|---|---|
| The seven lens | −2.05 | 1.544 | 56.1 |
| Glass plate | ∞ | 1.517 | 64.2 |

The continuity of the object side surface and the image side surface, the radius of curvature, SAG and semi-diameter SD of the first lens 10 (P1), the second lens 20 (P2), the third lens 30 (P3), the fourth lens 40 (P4), the fifth lens 50 (P5), the sixth lens 60 (P6) and the seventh lens 70 (P7) of the photographic optical system 1 are shown in table 2:

TABLE 2

| Lens | Continuity | Radius of curvature R | | SAG | Semi-diameter SD |
|---|---|---|---|---|---|
| P1 | Aspherical | R11 | −4.10 | SAG11 −0.389 | 3.187 |
|    | Aspherical | R12 | −3.95 | SAG12 −0.372 | 2.947 |
| P2 | Aspherical | R21 | 3.24 | SAG21 0.203 | 2.841 |
|    | Aspherical | R22 | 3.24 | SAG22 0.165 | 2.593 |
| P3 | Aspherical | R31 | 1.46 | SAG31 0.275 | 1.781 |
|    | Aspherical | R32 | 115.75 | SAG32 0.003 | 1.752 |
| P4 | Aspherical | R41 | 14.36 | SAG41 0.043 | 1.722 |
|    | Aspherical | R42 | 2.78 | SAG42 0.154 | 1.700 |
| P5 | Aspherical | R51 | −15.93 | SAG51 −0.150 | 1.691 |
|    | Aspherical | R52 | ∞ | SAG52 −0.135 | 1.900 |
| P6 | Aspherical | R61 | −5.74 | SAG61 −0.134 | 2.822 |
|    | Aspherical | R62 | −1.05 | SAG62 −0.512 | 3.230 |
| P7 | Aspherical | R71 | −15.19 | SAG71 −0.356 | 4.017 |
|    | Aspherical | R72 | 1.22 | SAG72 −0.191 | 4.711 |

Where,
R11: The curvature radius of the object side surface of the first lens P1.
R12: The curvature radius of the image side surface of the first lens P1.
R21: The curvature radius of the object side surface of the second lens P2.
R22: The curvature radius of the image side surface of the second lens P2.
R31: The curvature radius of the object side surface of the third lens P3.
R32: The curvature radius of the image side surface of the third lens P3.
R41: The curvature radius of the object side surface of the fourth lens P4.
R42: The curvature radius of the image side surface of the fourth lens P4.
R51: The curvature radius of the object side surface of the fifth lens P5.
R52: The curvature radius of the image side surface of the fifth lens P5.
R61: The curvature radius of the object side surface of the sixth lens P6.
R62: The curvature radius of the image side surface of the sixth lens P6.
R71: The curvature radius of the object side surface of the seven lens P7.
R72: The curvature radius of the image side surface of the seven lens P7.
SAG11: the distance from the surface projection point of the first lens on the optical axis to the lens center of the object side surface.
SAG12: the distance from the surface projection point of the first lens on the optical axis to the lens center of the image side surface.
SAG21: the distance from the surface projection point of the second lens on the optical axis to the lens center of the object side surface.
SAG22: the distance from the surface projection point of the second lens on the optical axis to the lens center of the image side surface.
SAG31: the distance from the surface projection point of the third lens on the optical axis to the lens center of the object side surface.
SAG32: the distance from the surface projection point of the third lens on the optical axis to the lens center of the image side surface.
SAG41: the distance from the surface projection point of the fourth lens on the optical axis to the lens center of the object side surface.
SAG42: the distance from the surface projection point of the fourth lens on the optical axis to the lens center of the image side surface.
SAG51: the distance from the surface projection point of the fifth lens on the optical axis to the lens center of the object side surface.
SAG52: the distance from the surface projection point of the fifth lens on the optical axis to the lens center of the image side surface.
SAG61: the distance from the surface projection point of the sixth lens on the optical axis to the lens center of the object side surface.
SAG62: the distance from the surface projection point of the sixth lens on the optical axis to the lens center of the image side surface.
SAG71: the distance from the surface projection point of the seven lens on the optical axis to the lens center of the object side surface.
SAG72: the distance from the surface projection point of the seven lens on the optical axis to the lens center of the image side surface.

The thickness of the first lens 10 (P1), the second lens 20 (P2), the aperture 100 (ST), the third lens 30 (P3), the fourth lens 40 (P4), the fifth lens 50 (P5), the sixth lens 60 (P6), the seventh lens 70 (P7) and the glass plate 180 (Tg) of the photographic optical system 1 is shown in table 3:

TABLE 3

| | Thickness (mm) |
|---|---|
| T1 | 0.367 |
| T12 | 0.050 |
| T2 | 0.250 |
| ST | 0.421 |
| T23 | −0.245 |
| T3 | 0.604 |
| T34 | 0.050 |
| T4 | 0.250 |
| T45 | 0.391 |
| T5 | 0.250 |
| T56 | 0.361 |
| T6 | 0.660 |
| T67 | 0.293 |
| T7 | 0.442 |
| Tg | 0.225 |

Where,
T1: The thickness of the first lens.
T12: The axial distance from the image side surface of the first lens and the object side surface of the second lens.
T2: The thickness of the second lens.
ST: The thickness of the aperture.
T23: The axial distance from the aperture to the object side surface of the third lens.

T3: The thickness of the third lens.
T34: The axial distance from the image side surface of the third lens and the object side surface of the fourth lens.
T4: The thickness of the fourth lens.
T45: The axial distance from the image side surface of the fourth lens to the fifth lens.
T5: The thickness of the fifth lens.
T56: The axial distance from the fifth lens to the sixth lens.
T6: The thickness of the sixth lens.
T67: The axial distance from the sixth lens to the seventh lens.
T7: The thickness of the seventh lens.

TABLE 4

Relation table between main light angle CRA and the image height of the photographic optical system

| Biggest image height percentage | Image height (mm) | CRA (degree) |
|---|---|---|
| 0.1H | 0.294 | 5.4 |
| 0.2H | 0.588 | 10.7 |
| 0.3H | 0.882 | 15.9 |
| 0.4H | 1.176 | 21.0 |
| 0.5H | 1.470 | 25.6 |
| 0.6H | 1.764 | 29.2 |
| 0.7H | 2.058 | 31.2 |
| 0.8H | 2.352 | 31.2 |
| 0.9H | 2.646 | 29.7 |
| 1.0H | 2.94 | 26.9 |
| max | — | 31.5 |

In this embodiment, DFOV=78.00°, HFOV=62.40°, VFOV=46.80°, in which: FOV is defined as the biggest view angle range of the photographic optical system, HFOV is defined as horizontal view angle, DFOV is defined as diagonal view angle, VFOV is defined as vertical view angle.

Figure 2:
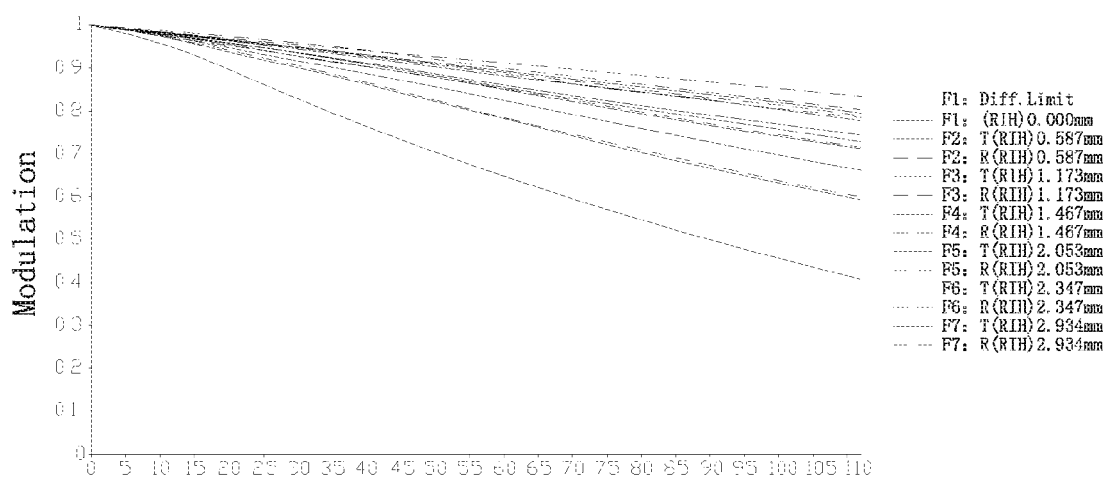
FIG. 2 is an MTF curve diagram of the photographic optical system shown in FIG. 1.
Figure 3:
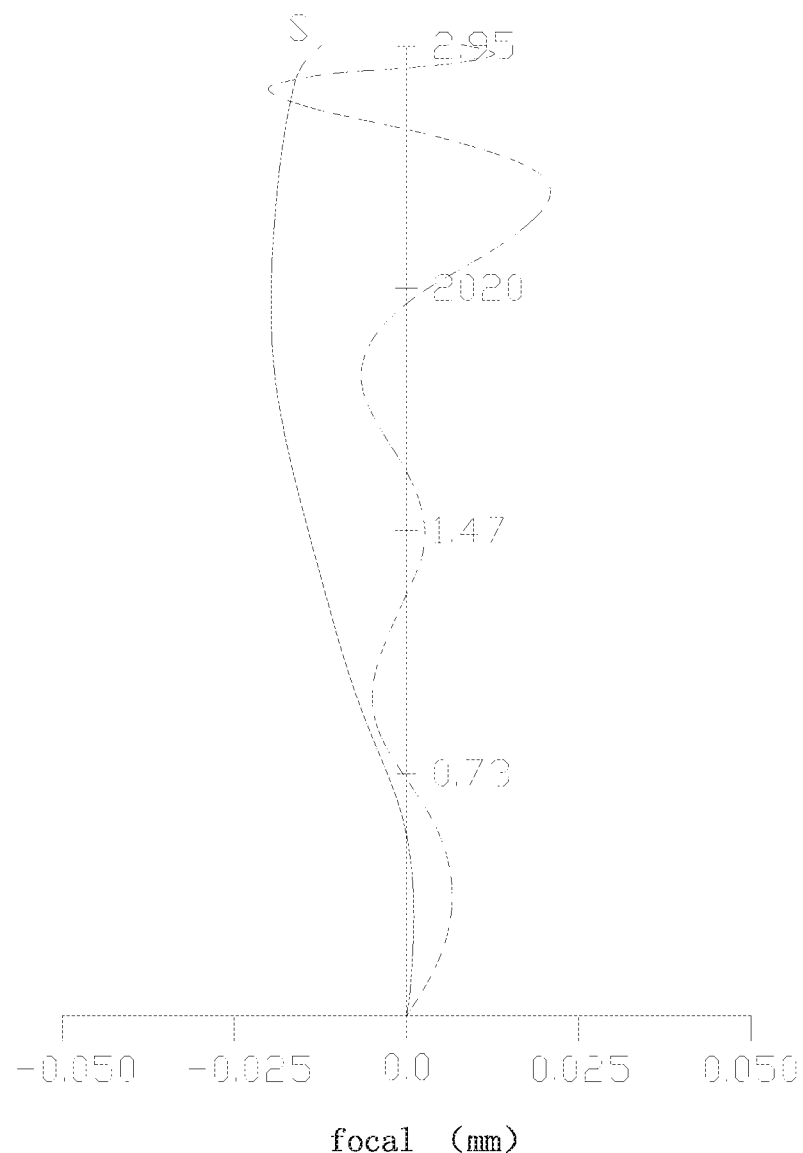
FIG. 3 is a field curvature curve diagram of the photographic optical system in FIG. 1.
Figure 4:
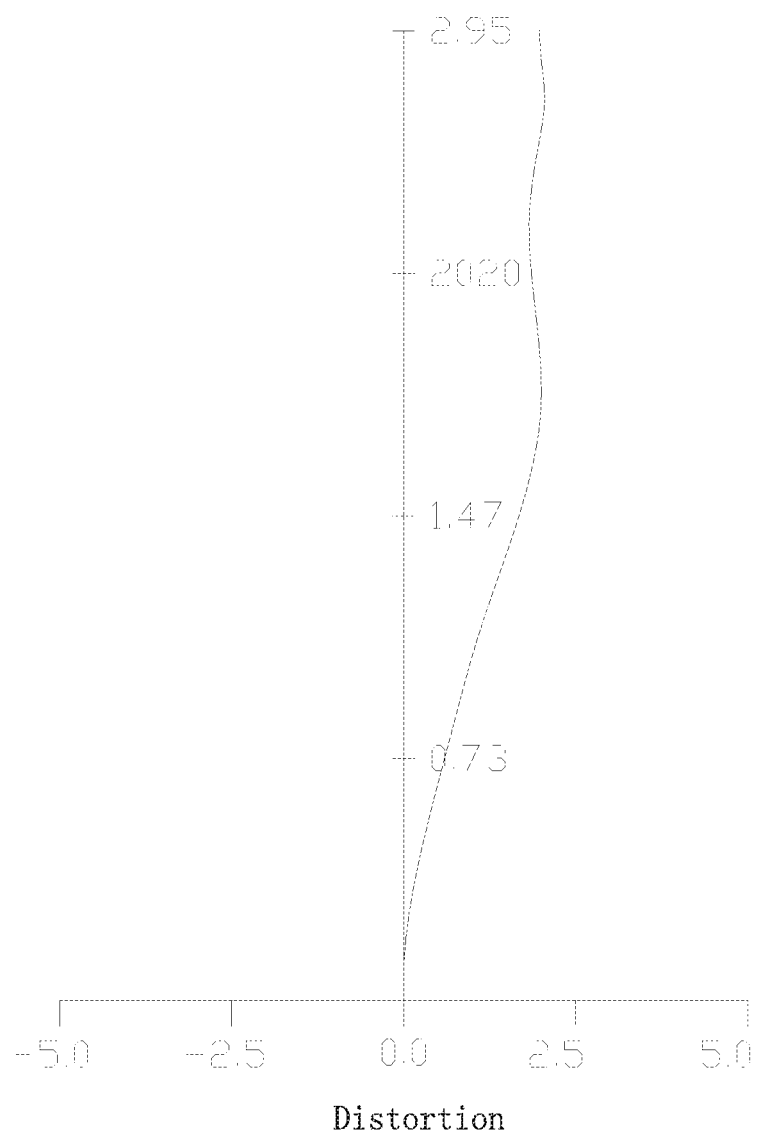
FIG. 4 is a distortion curve diagram of the photographic optical system in FIG. 1.

Please refer also to FIGS. 2-4, the photographic optical system 1 disclosed in the present invention has high optical performance.

In addition, in the photographic optical system 1 disclosed in the present invention, the photographic optical system 1 is designed on the basis of the optical system with large relative aperture, total optical length is less than 5.2 mm, view angle is between 78° to 88°. The ratio between the focal length and the system overall optical length of the photographic optical system meets the expression f/TTL>0.65.

The photographic optical system 1 disclosed in the present invention has following beneficial advantages:

In present invention, through optimizing surface type, distributing focal power, selecting optical material, a big relative aperture photographic optical system is designed, which can provide good imaging performance in low illumination environment. The image is clear. The combination focal power of the first lens 10 and the second lens 20 is approximate zero focal power lens, can correct rationally the spherical aberration, but does not introduce chromatic aberration and field curvature. The fourth lens 40 and the fifth lens 50 are made of material with high refractive index and low abbe number, can reduce effectively chromatic aberration of the system. The seventh lens 70 is negative refractive power lens which can reduce effectively the field curvature of the system.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A photographic optical system comprising, in an order from an object side to an image side:
a first lens, a second lens, a third lens, a fourth lens, a fifth lens, a sixth lens and a seventh lens; wherein the photographic optical system further meets the following conditions (1)~(7):

$$10<f1/f<40 \quad (1);$$

$$20<f2/f<80 \quad (2);$$

$$0.5<f3/f<1.5 \quad (3);$$

$$-2.5<f4/f<-0.5 \quad (4);$$

$$-10<f5/f<-2 \quad (5);$$

$$0.2<f6/f<1.2 \quad (6);$$

$$-1.5<f7/f<-0.4 \quad (7);$$

where,
f1: The focal length of the first lens;
f2: The focal length of the second lens;
f3: The focal length of the third lens;
f4: The focal length of the fourth lens;
f5: The focal length of the fifth lens;
f6: The focal length of the sixth lens;
f7: The focal length of the seven lens;
f: The focal length of whole photography optical system.

2. The photographic optical system as described in claim 1 further meeting the following conditions (1a)-(7a):

$$30 \text{ mm}<f1<150 \text{ mm} \quad (1a);$$

$$100 \text{ mm}<f2<500 \text{ mm} \quad (2a);$$

$$2 \text{ mm}<f3<5 \text{ mm} \quad (3a);$$

$$-10 \text{ mm}<f4<-2 \text{ mm} \quad (4a);$$

$$-30 \text{ mm}<f5<-10 \text{ mm} \quad (5a);$$

$$1\text{mm}<f6<5 \text{ mm} \quad (6a);$$

$$-5 \text{ mm}<f7<-1.5 \text{ mm} \quad (7a).$$

3. The photographic optical system as described in claim 1 further meeting the following conditions (1b)-(7b):

$$1.50<n1<1.55 \quad (1b);$$

$$1.50<n2<1.55 \quad (2b);$$

$$1.50<n3<1.55 \quad (3b);$$

$$1.60<n4<1.70 \quad (4b);$$

$$1.60<n5<1.70 \quad (5b);$$

$$1.50<n6<1.55 \quad (6b);$$

$$1.50<n7<1.55 \quad (7b);$$

where,
n1: The refractive power of the first lens;
n2: The refractive power of the second lens;

n3: The refractive power of the third lens;
n4: The refractive power of the fourth lens;
n5: The refractive power of the fifth lens;
n6: The refractive power of the sixth lens;
n7: The refractive power of the seven lens.

4. The photography optical system as described in claim 1 further meeting the following conditions (1c)-(7c):

$$40<v1<60 \quad (1c);$$

$$40<v2<60 \quad (2c);$$

$$40<v3<60 \quad (3c);$$

$$15<v4<30 \quad (4c);$$

$$15<v5<30 \quad (5c);$$

$$40<v6<60 \quad (6c);$$

$$40<v7<60 \quad (7c);$$

where,
v1: Abbe number of the first lens;
v2: Abbe number of the second lens;
v3: Abbe number of the third lens;
v4: Abbe number of the fourth lens;
v5: Abbe number of the fifth lens;
v6: Abbe number of the sixth lens;
v7: Abbe number of the seven lens.

5. The photography optical system as described in claim 1, wherein the first lens and the second lens meet following condition:

$$f12>50 \text{ mm or } f12<-50 \text{ mm}.$$

where,
f12: The combination focal length of the first lens and the second lens.

6. The photography optical system as described in claim 2, wherein the first lens is a positive lens or a negative lens and the object side surface of the first lens is concave.

7. The photography optical system as described in claim 2, wherein the seventh lens is a negative lens.

8. The photography optical system as described in claim 1 further meeting the following conditions:

$$TTL<5.2 \text{ mm};$$

$$78°<FOV<88°;$$

where,
TTL: The distance from the object side surface to the imaging surface of the first lens;
FOV: The biggest view angle range of the photographical optical system.

9. The photography optical system as described in claim 1, wherein the ratio between the system optical overall length and focal length of the photographic optical system meets the following condition:

$$f/TTL>0.65$$

where,
TTL: The distance from the object side surface to the imaging surface of the first lens.

10. The photography optical system as described in claim 7, wherein the image side surface of the seventh lens has at least one point of inflection and one stagnation point.

* * * * *